(12) United States Patent
Martz et al.

(10) Patent No.: US 8,193,293 B2
(45) Date of Patent: Jun. 5, 2012

(54) LOW TEMPERATURE CURABLE COATING COMPOSITIONS AND RELATED METHODS

(75) Inventors: Jonathan T. Martz, Glenshaw, PA (US); Erick B. Iezzi, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 296 days.

(21) Appl. No.: 12/049,521

(22) Filed: Mar. 17, 2008

(65) Prior Publication Data

US 2009/0234071 A1 Sep. 17, 2009

(51) Int. Cl.
*C08G 77/26* (2006.01)

(52) U.S. Cl. ............ 528/27; 528/38; 525/101; 525/102; 525/476

(58) Field of Classification Search .................... 528/27, 528/38; 525/101, 102, 476
See application file for complete search history.

(56) References Cited

U.S. PATENT DOCUMENTS

| | | | |
|---|---|---|---|
| 4,314,918 A | 2/1982 | Birkmeyer et al. | 260/20 |
| 4,678,835 A | 7/1987 | Chang et al. | 525/100 |
| 5,051,492 A | 9/1991 | Andre et al. | 528/361 |
| 5,424,383 A * | 6/1995 | Kimura et al. | 528/12 |
| 5,677,379 A | 10/1997 | Becker et al. | 525/101 |
| 5,703,178 A | 12/1997 | Gasmena | 525/476 |
| 5,804,616 A | 9/1998 | Mowrer et al. | 523/421 |
| 6,013,752 A | 1/2000 | Mowrer et al. | 528/26 |
| 6,069,203 A | 5/2000 | Henry et al. | 525/131 |
| 6,214,414 B1 | 4/2001 | Tang et al. | 427/333 |
| 6,225,434 B1 * | 5/2001 | Sadvary et al. | 427/407.1 |
| 6,281,321 B1 | 8/2001 | Kelly et al. | 528/17 |
| 6,395,858 B1 * | 5/2002 | Mack et al. | 528/38 |
| 6,451,930 B1 | 9/2002 | Burgman et al. | 525/452 |
| 6,491,845 B1 | 12/2002 | Schile | 252/182.24 |
| 6,569,980 B1 * | 5/2003 | Masaoka et al. | 528/27 |
| 6,623,701 B1 * | 9/2003 | Eichele et al. | 422/547 |
| 6,642,309 B2 * | 11/2003 | Komitsu et al. | 525/100 |
| 6,653,378 B2 * | 11/2003 | Ferritto et al. | 524/267 |
| 6,803,399 B2 * | 10/2004 | Ferritto et al. | 524/267 |
| 7,026,398 B2 | 4/2006 | Monkiewicz et al. | 525/100 |
| 7,125,609 B2 | 10/2006 | Klaassens et al. | 428/447 |
| 7,135,518 B2 * | 11/2006 | Bandou et al. | 524/445 |
| 2004/0116585 A1 * | 6/2004 | Ambrose et al. | 524/492 |
| 2006/0058451 A1 | 3/2006 | Gommans | |
| 2006/0205861 A1 | 9/2006 | Gordon et al. | 524/506 |
| 2007/0092738 A1 | 1/2007 | Gronlund Scholten et al. | 428/448 |
| 2007/0117938 A1 | 5/2007 | Martz | |
| 2007/0213492 A1 | 9/2007 | Mowrer et al. | 528/17 |

FOREIGN PATENT DOCUMENTS

| | | |
|---|---|---|
| DE | 19935471 A1 | 2/2001 |
| EP | 0 449 358 A2 | 10/1991 |
| EP | 0 375 078 B1 | 5/1995 |
| EP | 1116813 | 7/2001 |
| JP | 6-80600 A | 3/1994 |
| JP | 2003261746 A | 9/2003 |
| JP | 2004204192 | 7/2004 |
| JP | 2008036945 | 2/2008 |
| WO | WO 99/21906 | 5/1999 |
| WO | WO 01/07528 A1 | 2/2001 |
| WO | WO 2004/018562 A1 | 3/2004 |
| WO | WO 2005/080462 A2 | 9/2005 |

OTHER PUBLICATIONS

Chemical abstracts registry No. 26761-45-5 for Cardura E 10P, 1967, one page.
Chemical abstracts registry No. 165169-07-3 for Desmodur N. 3400, 1967, one page.
Chemical abstracts registry No. 182016-37-1 for Desmodur Z 4470, 1967, one page.
Product Bulletin: Cardura E10P Based Polyols as Reactive Diluents for Acrylic, Epoxy and Polyester Resins; Mar. 2002.

* cited by examiner

*Primary Examiner* — Margaret Moore
(74) *Attorney, Agent, or Firm* — Donald R. Palladino

(57) ABSTRACT

Disclosed are low temperature curable coating compositions, related coated substrates, methods for depositing a coating on a substrate and methods for refinishing the surface of an article, such as an automobile. The coating compositions include: (1) an aminofunctional silicon compound; (2) a polyether; and (3) a compound comprising functional groups reactive with the amino functionality of the aminofunctional silicon compound.

18 Claims, No Drawings

LOW TEMPERATURE CURABLE COATING COMPOSITIONS AND RELATED METHODS

FIELD OF THE INVENTION

The present invention relates to low temperature curable coating compositions, related coated substrates, methods for depositing a coating on a substrate and methods for refinishing the surface of an article, such as an automobile.

BACKGROUND INFORMATION

Low temperature, ambient curable coating compositions are desirable in many applications. For example, such coating compositions are, in at least some cases, preferable over, for example, thermally-cured or radiation cured coating compositions because (i) little or no energy is required to cure the composition, (ii) the materials from which some substrates are constructed cannot withstand elevated temperature cure conditions, and/or (iii) large or complex articles to be coated may not be convenient for processing through thermal or radiation cure equipment. For example, it is often necessary to employ low temperature, ambient curable coating compositions in automotive refinish applications where cure ovens and radiation cure equipment are often not available.

Some low temperature curable coating compositions are based on the hydrolysis and condensation of silane based materials that form a crosslinked Si—O—Si matrix. These compositions often form hard, highly crosslinked films, which are limited in flexibility. Therefore, the resultant coatings are often susceptible to chipping or thermal cracking due to embrittlement of the coating film. As a result, such coatings have not historically been suitable for use in automotive applications, such as automotive refinish applications.

In the automotive industry, by way of example, it is desirable to extend the life of vehicle bodies by protecting them from, for example, the abrasive chipping action of road dirt and debris, such as sand and gravel, that may cause an aesthetically unpleasing chipping of the vehicle body surface, which may also lead to rusting. Often, coating compositions designed to aid in various properties, such as corrosion resistance and chip resistance are employed to protect against such damage.

As a result, it would be desirable to provide low temperature, ambient curable coating compositions, preferably free of isocyanates and low in volatile organic content, which are capable of producing a flexible and/or impact resistant coating when applied to a substrate and cured. Moreover, it would be desirable to provide such coating compositions that are, in at least some cases, suitable for use as a topcoat on a vehicle, such as an automobile, truck, bus, van, boat, or aerospace vehicle, among others.

SUMMARY OF THE INVENTION

The present invention is generally directed to coating compositions comprising: (1) an aminofunctional silicon compound; (2) a polyether; and (3) a compound comprising functional groups reactive with the amino functionality of component (1).

More particularly, in certain respects, the present invention is directed to coating compositions comprising: (1) an aminofunctional polysiloxane; (2) a polyether; and (3) a compound comprising functional groups reactive with the amino functionality of the aminofunctional polysiloxane.

In other respects, the present invention is directed to coating compositions comprising: (1) an aminofunctional silicon compound; (2) a polyether comprising at least one of: (a) a copolymer that is the reaction product of (i) a glycidyl ester and/or ether, and (ii) a polyol; and (b) a polysiloxane-polyether; and (3) a compound comprising functional groups reactive with the amino functionality of the aminofunctional silicon compound.

In still other respects, the present invention is directed to compositions comprising: (1) an amino-functional polysiloxane; (2) an amino functional silane; (3) a polyether; and (4) a compound comprising functional groups reactive with the amino functionality of (1) and (2).

In yet other respects, the present invention is directed to coating compositions comprising: (1) an aminofunctional silicon compound; (2) a polyether comprising hydrolyzable groups; (3) an acrylic polymer comprising hydrolyzable groups; and (4) a compound comprising functional groups reactive with the amino functionality of component (1).

The present invention is also related to, inter alia, substrates at least partially coated with such compositions and methods for coating a substrate using such compositions.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Certain embodiments of the present invention are directed to low temperature, moisture curable coating compositions. As used herein, the term "low temperature, moisture curable" refers to coating compositions that, following application to a substrate, are capable of curing in the presence of ambient air, the air having a relative humidity of 10 to 100 percent, such as 25 to 80 percent, and a temperature in the range of −10 to 120°

C., such as 5 to 80° C., in some cases 10 to 60° C. and, in yet other cases, 15 to 40° C. As used herein, the term "cure" refers to a coating wherein any crosslinkable components of the composition are at least partially crosslinked. In certain embodiments, the crosslink density of the crosslinkable components, i.e., the degree of crosslinking, ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

The coating compositions of the present invention comprise an aminofunctional silicon compound. As used herein, the term "aminofunctional silicon compound" refers to a silicon containing compound, such as a polysiloxane or silane, having pendant and/or terminal amino groups.

In certain embodiments of the present invention, the aminofunctional silicon compound comprises an aminofunctional silane. Suitable aminofunctional silanes for use in the present invention include those having the general formula: Y—Si—(O—X)$_n$, wherein "n" is 2 or 3; each X, which can be the same or different, is an alkyl, hydroxyalkyl, alkoxyalkyl or hydroxyalkoxyalkyl group containing less than six carbon atoms; and Y is H(HNR)$_c$, wherein "c" is an integer having a value of from 1 to 6; and each R is a difunctional organic group independently selected from the group consisting of aryl, alkyl, dialkylaryl, alkoxyalkyl, and cycloalkyl groups, wherein R can vary within each Y molecule. Such materials are further described in United States Patent Application Publication 2006/0058451 at [0052] to [0054], the cited portion of which being incorporated herein by reference.

In certain embodiments, the coating compositions of the present invention comprise an aminosilane of the general formula: $BR_eSi(OR^3)_{3-e}$, wherein R is a $C_{1-18}$ hydrocarbon group; $R^3$ is an alkyl group having from 1 to 8 carbon atoms; e is 0, 1, or 2; and B is a group of the formula $CR^2{}_2$—Y; wherein $R^2$ is hydrogen or an alkyl group having from 1 to 4 carbon atoms and Y is a group comprising a nitrogen atom.

Examples of suitable Y groups in the preceding paragraph are —$NH_2$, —$NHR^4$ and —$NR^4{}_2$ groups, wherein $R^4$ is a monovalent organic radical optionally containing nitrogen and/or oxygen atoms, such as a monovalent hydrocarbon group optionally containing nitrogen and/or oxygen atoms and having from 1 to 18 carbon atoms. Examples of suitable B groups in the preceding paragraph are aminomethyl, methylaminomethyl, dimethylaminomethyl, diethylaminomethyl, dibutylaminomethyl, cyclohexylaminomethyl, anilinomethyl, 3-dimethylaminopropylaminomethyl, bis(3-dimethylaminopropyl)aminomethyl, and groups of the formulae —$CH_2NHCOR^4$, —$CH_2NHCO_2R^4$ or —$CH_2NHCONHR^4$, where $R^4$ is as defined above.

Specific examples of aminosilanes of the general formula $BR_eSi(OR^3)_{3-e}$, which are suitable for use in the present invention, include diethylaminomethylmethyldimethoxysilane, dibutylaminomethyltriethoxysilane, dibutylaminomethyltributoxysilane, cyclohexylaminomethyltrimethoxysilane, cyclohexylaminomethyltriethoxysilane, cyclohexylaminomethylmethyldiethoxysilane, anilinomethyltriethoxysilane, 3-dimethylaminopropylaminomethyltrimethoxysilane, 3-aminopropylmethyldiethoxysilane, and acetylaminomethylmethyldimethoxysilane. Such materials are described in U.S. Pat. No. 7,126,020 at col. 2, lines 37 to 49 and col. 3, line 62 to col. 4, line 52, the cited portions of which being incorporated by reference herein. In addition, such materials are also commercially available from, for example, Wacker Silicones under the Geniosil® tradename, such as Geniosil® XL 924, XL 926, and XL 973 and Gelest, Inc., Morrisville, Pa., such as SIA0605.0.

In certain embodiments, the aminofunctional silane is present in the coating composition in an amount of at least 1 percent by weight, such as at least 2 percent by weight, or, in some cases, at least 5 percent by weight. In certain embodiments, the aminofunctional silane is present in the coating composition in an amount of no more than 60 percent by weight, such as no more than 40 percent by weight, or, in some cases, no more than 20 percent by weight. The foregoing weight percents are based on the total weight of resin solids the coating composition.

In certain embodiments, the aminofunctional silicon compound present in the coating compositions of the present invention comprises an aminofunctional polysiloxane. As used herein, the term "aminofunctional polysiloxane" refers to a linear or branched polymeric constituent having one or more polysiloxane blocks and having pendant and/or terminal amino groups.

The amino functionalities may, e.g., be introduced to the reactive polysiloxane by means of an aminosilane (i.e. an aminosilane such as those defined above), see e.g. U.S. Pat. No. 4,857,608. It should also be understood that the aminofunctional polysiloxane may be prepared in situ. In some examples, a hydroxyl-functional or alkoxy-functional polysiloxane is reacted with an aminosilane whereby amino-functionalities are introduced. For example an aminosilane can be reacted with an α,ω-dihydroxypolydimethylsiloxane at a temperature in the range of 20-80° C., often using 0.4-1.2 alkoxy groups of the aminosilane per silanol group of the polysiloxane. If an excess of aminosilane is used, or if the reaction is not allowed to proceed to completion, a small amount of aminosilane may remain in the product. In certain embodiments, at least one amino-functional polysiloxane is the reaction product of a polysiloxane and an aminosilane.

Examples of amino-functional polysiloxanes are u.,co-di-amino-functional polysiloxanes (e.g. polysiloxane fluids). Illustrative examples of commercially available amino-functional polysiloxanes are SILRES HP 2000 (amino-functionalized methyl-phenyl silicone) from Wacker and SF1708 (Amino functionalized polysiloxane fluid) from General Electric Co.

In certain embodiments, the aminofunctional polysiloxane is present in the coating composition in an amount of at least 1 percent by weight, such as at least 2 percent by weight, or, in some cases, at least 5 percent by weight. In certain embodiments, the aminofunctional polysiloxane is present in the coating composition in an amount of no more than 60 percent by weight, such as no more than 40 percent by weight, or, in some cases, no more than 20 percent by weight. The foregoing weight percents are based on the total weight of resins solids in the coating composition.

In certain embodiments, the aminofunctional silicon compound present in the coating compositions of the present invention comprises both an aminofunctional silane and an aminofunctional polysiloxane, i.e. the composition comprises one or more amino-functional polysiloxanes as well as one or more aminosilane(s). This combination can be accomplished by adding an amino-functional polysiloxane (as described above) and an aminosilane (as described above), or by using a reaction product between an aminosilane and a polysiloxane in which a portion of the aminosilane remains unreacted.

In certain embodiments, the combination of aminofunctional polysiloxane and aminofunctional silane is present in the coating compositions of the present invention in an amount of at least 1 percent by weight, such as at least 2 percent by weight, or, in some cases, at least 5 percent by weight. In certain embodiments, the combination of aminofunctional polysiloxane and aminofunctional silane is present in the coating composition in an amount of no more than 60 percent by weight, such as no more than 40 percent by weight, or, in some cases, no more than 20 percent by weight. The foregoing weight percents are based on the total weight of resins solids in the coating composition. In certain of these embodiments, the weight ratio of aminofunctional polysiloxane to aminofunctional silane is from 1:10 to 10:1, such as 1:5 to 5:1, or, in some cases 1:2 to 2:1.

As previously indicated, the coating compositions of the present invention also comprise a polyether. As used herein, the term "polyether" refers to a linear or branched polymeric constituent having a plurality of ether linkages. For example, in certain embodiments, the polyether comprises hydrolyzable functional groups. More particularly, in certain embodiments, the polyether present in the coating compositions of the present invention comprises a silicon containing polyether. As used herein, the term "silicon containing polyether" refers to polyethers having pendant and/or terminal silane groups.

In certain embodiments, the coating compositions of the present invention comprise a silicon containing polyether represented by the general formula:

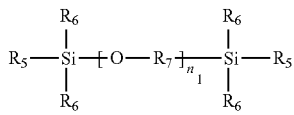

where each $R_5$ can be selected from the group of saturated hydrocarbons having in the range of from one to six carbon atoms, where each $R_5$ can be the same or different, where each $R_6$ can be an alkoxy group having in the range of from one to three carbon atoms, where each $R_6$ can be the same or different, where $R_7$ can be selected from the group of saturated or unsaturated hydrocarbons having in the range of from about one to twelve carbon atoms, and where $n_1$ is selected so that the silicon-modified polyether has an average molecular weight in the range of from about 250 to 5,000.

In certain embodiments, the coating compositions of the present invention comprise a polyether that is a copolymer produced from reacting a glycidyl ester and/or ether with a polyol. Certain such reaction products are described in U.S. Pat. No. 5,051,492, incorporated herein by reference.

In other embodiments, however, the foregoing copolymer is produced from reacting a glycidyl ester and/or ether with a polyol comprising a functionality of at least 2 wherein at least 50% by weight of the copolymer comprises a minimum of 3n+X repeating units, wherein n is a monomer unit and X is a monomer unit and/or other reactant. Such copolymers are described in United States Patent Application Publication No. 2007-0117938 A1, the entirety of which being incorporated herein by reference.

More specifically, in certain embodiments of the foregoing copolymer, a glycidyl ester, such as the glycidyl ester of a $C_5$-$C_{12}$ aliphatic acid, is used. In other embodiments a glycidyl ether, such as the glycidyl ether of a $C_5$-$C_{12}$ aliphatic alcohol, is used. Illustrative of a glycidyl ester is a monoglycidyl ester of a branched carboxylic acid such as pivalic acid and versatic acid. One such material is commercially available as CARDURA E10.

In these copolymers, the polyol reacted with the glycidyl ester and/or ether is one that has a functionality ranging from 2 to 16 or, in some cases, from 2 to 5. Polyols of varying molecular weights may be used. In other embodiments, the polyol has a number average molecular weight (Mn) of less than 300. Some examples of such polyols include neopentyl glycol, 2-ethyl-1,3 hexane diol, cyclohexane dimethanol, trimethylolpropane, tris(hydroxyethyl)isocyanurate, and pentaerythritol.

In certain embodiments of the foregoing copolymer, the molar ratio of glycidyl ester and/or ether:polyol is at least 3:1. For instance, ratios of 3:1, 4:1, and 5:1 are typical as well as any variation thereof, i.e., 2.8:0.18.

The reaction can be carried out in the presence of a catalyst. One such catalyst is stannous octoate. If the catalyst is used, it is often present in an amount sufficient to accelerate the reaction of the glycidyl ester with the polyol. The catalyst is often used in an amount ranging from 0.01% to 1.0% based on the total weight of the reactants.

The foregoing copolymers produced by way of the reaction recited above have a molecular weight distribution, defined as the ratio of the weight average molecular weight, Mw, to the number average molecular weight, Mn, that is greater than 1.10. The molecular weight distribution is dependent on the properties and functionality of the polyol used in the reaction. In certain embodiments, the copolymer has a Mn of at least 500 g/mol.

In some embodiments, a molar ratio of glycidyl ester and/or ether:polyol is greater than or equal to 3:1 and the polyol has a functionality of at least 2, when producing the foregoing copolymer. In these embodiments, the resultant copolymer comprises 50% by weight of the copolymer having a minimum of 3n+X repeating units, wherein n is a monomer unit and X is a monomer unit, the same or different from n, and/or other reactant. "Other reactant" includes such things as adducts and/or low molecular weight residues formed during the reaction. Determining if the copolymer has a minimum of 3n+X repeating units can be accomplished by analyzing its GPC data. For example, a copolymer can be formed from the reaction of 3 moles of CARDURA E with 1 mole of neopentyl glycol. In order to achieve greater than 50% of the copolymer having a minimum of 3n+X repeating units, at least 50% of the reaction product must have a molecular weight greater than 824 g/mole which correlates to 3 moles of CARDURA E at a Mw of 240 grams/mole to 1 mole of neopentyl glycol at a Mw of 104 grams/mole.

In certain embodiments, the copolymer has less than 50% polymeric units having the same molecular weight. That is, there is no single peak in the GPC result that has an area percentage greater than 50% of the total peaks. Again, this can also be determined by analyzing the GPC data of the copolymer.

In certain embodiments, hydrolyzable groups, such as silane groups, may be incorporated onto the foregoing copolymer to form a silicon containing polyether that comprises the foregoing copolymer. In certain embodiments, therefore, the coating compositions of the present invention comprise a silicon containing polyether that comprises the reaction product of: (a) a copolymer comprising the reaction product of a glycidyl ester and/or ether and a polyol, and (b) a silane functional compound comprising a functional group reactive with the functional groups of the copolymer. Exemplary functional groups reactive with the copolymer are aminoplasts, isocyanates, including blocked isocyanates, epoxides, beta-hydroxyalkylamides, acids, anhydrides, organometallic acid-functional materials, amines, amides, hydroxyls, and ureas.

In certain embodiments of the present invention, the silane functional compound comprising functional groups reactive with the functional groups of the copolymer comprises a monoisocyanate functional alkoxysilane. Specific examples of such materials, which are suitable for use in the present invention, include, without limitation, γ-isocyanate-propyl-triethoxysilane, and γ-isocyanate-propyltrimethoxysilane, including mixtures thereof.

The Examples herein illustrate suitable methods for producing such silicon containing polyethers.

In certain embodiments, the polyether included in the coating compositions of the present invention comprises a polysiloxane-polyether. As used herein, the term "polysiloxane-polyether" refers to a polymeric constituent that is both a polyether, i.e., it comprises a plurality of ether linkages as described above, and a polysiloxane, i.e., it comprises one or more polysiloxane blocks. In certain embodiments, the polysiloxane-polyether comprises a silicon containing polysiloxane-polyether. As used herein, the term "silicon containing polysiloxane-polyether" refers to a polysiloxane-polyether that has pendant and/or terminal silane groups.

Polysiloxane-polyethers suitable for use in the present invention, and methods for their preparation, are described in U.S. Pat. No. 6,225,434 at col. 2, line 6 to col. 6, line 63, the cited portion of which being incorporated herein by reference.

As previously mentioned, in certain embodiments, the polysiloxane-polyether comprises a silicon containing polysiloxane-polyether. Such silicon containing polysiloxane-polyethers can be prepared by a variety of methods, however, in certain embodiments, such compounds are derived from a polysiloxane-polyether having hydroxyl functional groups, prepared as described in U.S. Pat. No. 6,225,434 at col. 5, lines 17-27, the cited portion of which being incorporated herein by reference. In these embodiments, the hydroxyl functional groups containing polysiloxane-polyether can then be reacted with, for example, a monoisocyanate functional alkoxysilane, such as any of those described earlier, to produce a silicon containing polysiloxane-polyether suitable for use in the coating compositions of the present invention.

A polysiloxane-polyether may comprise the ungelled reaction product of the following reactants (i) and (ii):

(i) one or more polysiloxanes containing silicon hydride having the structure (II):

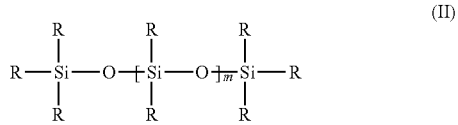

wherein the R groups are independently selected from the group consisting of H, OH, and monovalent hydrocarbon groups connected to the silicon atoms, provided at least one of the groups represented by R is H; and m has a value ranging from 0 to 100, preferably 0 to 5, such that the mole percent of hydrogen-bonded silicon atoms to non-hydrogen-bonded silicon atoms ranges from 10 to 100; and (ii) one or more materials having two or more, preferably two, unsaturated bonds capable of undergoing hydrosilylation reaction with the silicon hydride group (Si—H) of the polysiloxane. Preferably, reactant (ii) contains functional groups, most preferably, hydroxyl functional groups.

By "ungelled" is meant that the reaction products are substantially free of crosslinking and have an intrinsic viscosity when dissolved in a suitable solvent, as determined, for example, in accordance with ASTM-D1795 or ASTM-D4243. The intrinsic viscosity of the reaction product is an indication of its molecular weight. A gelled reaction product, on the other hand, since it is of essentially infinitely high molecular weight, will have an intrinsic viscosity too high to measure.

It should be appreciated that the various R groups can be the same or different and it is usually the case that the R groups will be mixed groups or entirely monovalent hydrocarbon groups.

As used herein and in the claims, "monovalent hydrocarbon groups" means organic groups containing essentially carbon and hydrogen. The hydrocarbon groups can be branched or unbranched, aliphatic, aromatic, cyclic, or acyclic and can contain from 1 to 24 (in the case of aromatic from 3 to 24) carbon atoms. The hydrocarbon groups can be substituted with heteroatoms, for example, oxygen. Examples of such monovalent hydrocarbon groups include alkyl, alkoxy, aryl, alkaryl or alkoxyaryl groups.

By "alkylene" is meant acyclic or cyclic alkylene groups having a carbon chain length of from $C_2$ to $C_{25}$. Examples of suitable alkylene groups include those derived from propene, butene, pentene, 1-decene, isoprene, myrcene, and 1-heneicosene. By "oxyalkylene" is meant an alkylene group containing at least one ether oxygen atom and having a carbon chain length of from $C_2$ to $C_{25}$, preferably from $C_2$ to $C_4$. Examples of suitable oxyalkylene groups include those derived from trimethylolpropane monoallyl ether, pentaerythritol monoallyl ether, trimethylolpropane diallylether, polyethoxylated allyl alcohol, and polypropoxylated allyl alcohol. By "alkylene aryl" is meant an acyclic alkylene group containing at least one aryl group, preferably phenyl, and having an alkylene carbon chain length of from $C_2$ to $C_{25}$. The aryl group can be substituted, if desired. Suitable substituent groups include hydroxyl, benzyl, carboxylic acid, and aliphatic groups. Examples of suitable alkylene aryl groups include those derived from styrene and 3-isopropenyl-α,α-dimethylbenzyl isocyanate.

It should be understood that the ratio of reactants (i) and (ii) and reaction conditions are selected to produce a "chain extended" polysiloxane reaction product. The term "chain extended" as used herein is intended to mean that two or more organic polysiloxanes containing silicon hydride are linked or co-polymerized between at least one Si—H group of one polysiloxane containing silicon hydride and a Si—H group of another via a hydrosilylation reaction with a material having two or more unsaturated bonds capable of undergoing hydrosilylation reaction. To control molecular weight and prevent formation of a gelled reaction product, a material having only one unsaturated bond capable of undergoing hydrosilylation reaction is usually included as a reactant to serve as a "chain terminator". Examples of such materials which are suitable for use in the present invention include trimethylol propane monoallyl ether, pentaerythritol monoallyl ether, vinyl cyclohexane diol, styrene, and the like. Alternatively, to control molecular weight and to prevent formation of a gelled reaction product, a material having only one Si—H bond capable of undergoing hydrosilylation reaction can be included to serve as a "chain-terminator". Examples of suitable materials having only one Si—H capable of undergoing hydrosilylation reaction include trimethylsilane, triphenylsilane, and bis(trimethylsiloxy)methyl silane.

Preparation of the chain-extended organic polysiloxane typically is carried out in the following manner. An admixture of the material having only one unsaturated bond capable of undergoing hydrosilylation reaction and the material having at least two unsaturated bonds capable of undergoing hydrosilylation reaction is added to a reaction vessel equipped with a means for maintaining a nitrogen blanket. Added concurrently is approximately 25 to 75 ppm sodium bicarbonate or metal acetate salt to inhibit possible undesirable side reactions such as those associated with acetal condensation via a propenyl ether moiety. The temperature is increased to 75° C. to 80° C. under nitrogen, at which time 50 to 65 percent of the total amount of polysiloxane containing silicon hydride is added under agitation. A catalyst such as a transition metal, for example, nickel and/or salts thereof, iridium salts and, more preferably, a Group VIII noble metal, usually, platinum in the form of chloroplatinic acid, is then added and the reaction mixture is allowed to exotherm to 85° C. Generally, the exotherm can be controlled by adjusting rates of addition of the reactants. Addition of the remainder of the polysiloxane containing silicon hydride is completed as the reaction temperature is maintained at about 80° C. to 85° C. The chain-extension reaction is monitored by infrared spectroscopy for disappearance of the silicon hydride adsorption band (Si—H: 2150 cm$^{-1}$).

Alternatively, the material having only one unsaturated bond capable of undergoing hydrosilylation reaction and the material having at least two unsaturated bonds capable of undergoing hydrosilylation reaction are added as separate reactants. The former is added initially and is reacted with 50 to 65 percent of the total amount of polysiloxane containing silicon hydride in the presence of the catalyst. The ratio of these two reactants is selected such that, subsequent to hydrosilylation reaction, there remains an amount of unreacted Si—H available for subsequent chain-extension reaction. The material having at least two unsaturated bonds capable of undergoing hydrosilylation reaction is then added, and then addition of the remainder of the polysiloxane containing silicon hydride is completed as the reaction temperature is maintained at about 80° C. to 85° C. The chain-extension reaction is monitored by infrared spectroscopy for disappearance of the silicon hydride adsorption band.

In a preferred multi-component composite coating compositions of the invention, the equivalent ratio of Si—H to total unsaturation capable of undergoing hydrosilylation reaction ranges from 0.5 to 2:1.

It also should be noted that the level of unsaturation contained in reactant (ii) above, is selected to ensure an ungelled reaction product containing at least one unit of the structure (I):

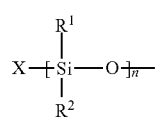

wherein $R_1$ and $R_2$ are independently selected from the group consisting of OH and monovalent hydrocarbon groups; X is an organic polyvalent linking group selected from the group consisting of alkylene, oxyalkylene, and alkylene aryl, which is derived from a material having two or more unsaturated bonds capable of undergoing hydrosilylation reaction; and n has a value ranging from 2 to 4 such that n is equal to the number of unsaturated bonds capable of undergoing hydrosilylation reaction.

In other words, when a polysiloxane containing silicon hydride having a higher average value of Si—H functionality is used, reactant (ii) should have a lower level of unsaturation.

For example, in a preferred embodiment of the invention, the polysiloxane containing silicon hydride (i) is a low molecular weight material where m ranges from 0 to 5 and the average value of Si—H functionality is approximately two. In this case, reactant (ii) can contain two or more, unsaturated bonds capable of undergoing hydrosilylation reaction without the occurrence of gelation.

Examples of the preferred polysiloxane containing silicon hydride include 1,1,3,3-tetramethyl disiloxane where m is 0 and the average Si—H functionality is two; and the polymethyl polysiloxane containing silicon hydride, where m ranges from 4 to 5 and the average Si—H functionality is about two, commercially available from BASF Corporation as MASILWAX BASE. Preferably, reactant (ii) contains at least two unsaturated bonds in the terminal position.

In a preferred embodiment, the reactive functional groups of the polysiloxane (a) are provided by reactant (ii) above. The reactive functional groups of the polysiloxane (a) are typically selected from the group consisting of hydroxyl, carbamate, urea, urethane, alkoxysilane, epoxy, isocyanate and blocked isocyanate and carboxylic acid functional groups. Hydroxyl and/or carbamate group-containing polysiloxanes are preferred.

To provide polysiloxanes having hydroxyl functional group, preferred materials for use as reactant (ii) above include hydroxyl functional group-containing polyallyl ethers such as those selected from the group consisting of trimethylolpropane diallyl ether, pentaerythritol diallyl ether, pentaerythritol triallyl ether and mixtures thereof. Trimethylolpropane diallyl ether is preferred. Mixtures of such polyallyl ethers with monoallyl ethers or alcohols are suitable as well. Reaction conditions and the ratio of reactants (i) and (ii) are selected so as to form the desired functional group.

Typically, the polysiloxane containing hydroxyl functional groups has a hydroxyl equivalent weight of at least 1000 grams per equivalent, preferably at least 500 grams per equivalent, and more preferably at least 250 grams per equivalent. The polysiloxane containing hydroxyl functional groups also typically has a hydroxyl equivalent weight of less than 1000 grams per equivalent, more preferably less than 500 grams per equivalent, and more preferably 250 grams per equivalent. The hydroxyl equivalent weight of the polysiloxane containing hydroxyl functional groups can range between any combination of these values inclusive of the recited values.

In another preferred embodiment of the invention, the polysiloxane (a) contains carbamate functional groups and, preferably, comprises the ungelled reaction product of the following reactants:

(i) one or more polysiloxanes containing silicotihydride of structure (II) above where R and m are as described above for that structure;

(ii) one or more hydroxyl functional group-containing materials having two or more unsaturated bonds capable of undergoing hydrosilylation reaction as described above; and (iii) one or more low molecular weight carbamate functional materials, preferably comprising the reaction product of an alcohol or glycol ether and a urea.

The carbamate functional groups typically are incorporated into the polysiloxane by reacting the hydroxyl functional group-containing polysiloxane with the low molecular weight carbamate functional material via a "transcarbamylation" process. The low molecular weight carbamate functional material, which is derived from an alcohol or glycol ether, reacts with the free hydroxyl groups of the polysiloxane, yielding a carbamate functional polysiloxane and the original alcohol or glycol ether. Reaction conditions and the ratio of reactants (i), (ii), and (iii) are selected so as to form the desired groups.

The low molecular weight carbamate functional material is usually prepared by reacting the alcohol or glycol ether with urea in the presence of a catalyst such as butyl stannoic acid. Suitable alcohols include lower molecular weight aliphatic, cycloaliphatic, and aromatic alcohols, for example, methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether is preferred. The incorporation of carbamate functional groups into the polysiloxane can also be achieved by reacting isocyanic acid with the free hydroxyl groups of the polysiloxane.

As aforementioned, in addition to or in lieu of hydroxyl and/or carbamate functional groups, the polysiloxane (a) can contain other reactive functional groups such as epoxy, isocyanate, and carboxylic acid functional groups. To form polysiloxanes containing epoxy functional groups, a polysiloxane containing hydroxyl functional groups as described above is further reacted with a polyepoxide. The polyepoxide is preferably an aliphatic or cycloaliphatic polyepoxide or mixtures thereof. Examples of polyepoxides suitable for use in the present invention include epoxy functional acrylic copolymers prepared from at least one ethylenically unsaturated monomer having at least one epoxy group, for example, glycidyl (meth)acrylate and allyl glycidyl ether, and one or more ethylenically unsaturated monomers which have no epoxy functionality. The preparation of such epoxy functional acrylic copolymers is described in detail in U.S. Pat. No. 4,681,811 at column 4, line 52 to column 5, line 50, incorporated herein by reference. Reaction conditions and the ratio of reactants are selected so as to form the desired functional groups.

Isocyanate functional group-containing polysiloxanes typically are prepared by reacting a polysiloxane containing hydroxyl functional groups, as described above, with a polyisocyanate, preferably a diisocyanate. Examples of suitable polyisocyanates include aliphatic polyisocyanates, particularly aliphatic diisocyanates, for example 1,4-tetramethylene diisocyanate and 1,6-hexamethylene diisocyanate; cycloaliphatic polyisocyanates, for example, 1,4-cyclohexyl diisocyanate, isophorone diisocyanate and a,a-xylylene diisocyanate; and aromatic polyisocyanates, for example, 4,4'-diphenylmethane diisocyanate, 1,3-phenylene diisocyanate, and tolylene diisocyanate. These and other suitable polyisocyanates are described in more detail in U.S. Pat. No. 4,046,729 at column 5, line 26 to column 6, line 28, incorporated herein by reference. Preferred are aliphatic or cycloaliphatic diisocyanates or mixtures thereof Reaction conditions and the ratio of reactants are selected so as to form the desired functional groups.

Carboxylic acid functional group-containing polysiloxane, typically are prepared by reacting a polysiloxane containing hydroxyl functional groups, as described above, with a polycarboxylic acid or anhydride, preferably an anhydride. Examples of polycarboxylic acids suitable for use in the present invention include adipic acid, sebacic acid and dodecanedioic acid. Examples of anhydrides suitable for use in the present invention include hexahydrophthalic anhydride, methylhexahydrophthalic anhydride, phthalic anhydride, trimellitic anhydride, succinic anhydride, chlorendic anhydride, alkenyl succinic anhydride, and substituted alkenyl anhydride such as octenyl succinic anhydride and mixtures thereof. Reaction conditions and the ratio of reactants are selected so as to form the desired functional groups.

In certain embodiments, the polyether, such as any of the previously described silicon containing polyethers, including the silicon containing polysiloxane-polyether, is present in the coating compositions of the present invention in an amount of at least 1 percent by weight, such as at least 5 percent by weight, or, in some cases, at least 10 percent by weight. In certain embodiments, the polyether, such as any of the previously described silicon containing polyethers, including the silicon containing polysiloxane-polyether, is present in the coating compositions of the present invention in an amount of no more than 60 percent by weight, such as no more than 40 percent by weight, or, in some cases, no more than 30 percent by weight. The foregoing weight percents are based on the total weight of resins solids in the coating composition.

In certain embodiments, the coating compositions of the present invention also comprise an acrylic polymer. More particularly, in certain embodiments, the coating compositions of the present invention comprise an acrylic polymer comprising hydrolyzable functional groups. More particularly, in certain embodiments, the acrylic polymer present in the coating compositions of the present invention comprises a silicon containing acrylic polymer. As used herein, the term "silicon containing acrylic polymer" refers to acrylic polymers having pendant and/or terminal silane groups.

Silicon containing acrylic polymers are often the reaction product of one or more monomers in which at least one monomer has a pendant silane group. The acrylic polymer can be a homopolymer of silane group-containing acrylic monomers. In many cases, however, the acrylic polymer is a co-polymer of two or more acrylic monomers, one of which includes a pendant silane group.

Examples of acrylic monomers which include a pendant silane group, and which are suitable for use in the present invention, are those having the general structure:

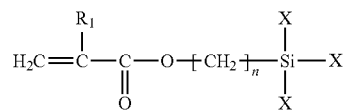

wherein $R_1$ is hydrogen or methyl, each X, which may be the same or different, is alkoxy, aryl, or alkyl and n is 1 to 3. In certain embodiments, the foregoing oxyalkylsilane acrylic monomer is γ-methacryloxypropyltrimethoxysilane (SILQUEST® A-174 silane). A second monomer that, optionally, can be co-polymerized with the foregoing monomer is any vinyl monomer different from the silane group-containing acrylic monomer and which is copolymerizable therewith. Specific examples of such vinyl monomers include, but are not limited to, methyl (meth)acrylate, ethyl (meth)acrylate, butyl (meth)acrylate, ethylhexyl (meth)acrylate, stearyl (meth)acrylate, benzyl (meth)acrylate, cyclohexyl (meth)acrylate, lauryl (meth)acrylate, isobornyl (meth)acrylate, hydroxypropyl (meth)acrylate, hydroxyethyl (meth)acrylate, hydroxybutyl (meth)acrylate, trifluoroethyl (meth)acrylate, pentafluoropropyl (meth)acrylate, perfluorocyclohexyl (meth)acrylate, (meth)acrylonitrile, glycidyl (meth)acrylate, dimethylaminoethyl (meth)acrylate, diethylaminoethyl (meth)acrylate, (meth)acrylamide, alpha-ethyl (meth)acrylamide, N-butoxymethyl (meth)acrylamide, N,N-dimethyl acrylamide, N-methyl acrylamide, acryloyl morpholine, N-methylol (meth)acrylamide, and styrene, or combinations thereof.

In certain embodiments of the present invention, the acrylic polymer, such as the previously described silicon containing acrylic polymer, has a weight average molecular weight (Mw) typically ranging from 1,000 to 50,000, such as 3,000 to 35,000, or, in some cases, 5,000 to 15,000 as determined by gel permeation chromatography using polystyrene standards.

In certain embodiments of the present invention, the acrylic polymer, such as the previously described silicon containing acrylic polymer, is present in the coating compositions of the present invention in an amount of at least 1 percent by weight, such as at least 5 percent by weight. In certain embodiments of the present invention, the acrylic polymer, such as the previously described silicon containing acrylic polymer, is present in the coating compositions of the present invention in an amount of no more than 40 percent by weight, such as no more than 30 percent by weight, or, in some cases, no more than 20 percent by weight. The foregoing weight percents are based on the total weight of resins solids in the coating composition.

As previously indicated, certain embodiments of the present invention comprise a compound comprising functional groups reactive with the amino functionality of the aminofunctional silicon compound(s). As will be appreciated by those skilled in the art, such functional groups include, but are not limited to, isocyanates, epoxies, and ethylenically unsaturated groups. In certain embodiments, such a compound is selected from a polyepoxide, a compound having two or more ethylenically unsaturated groups, or a mixture thereof.

As used herein, the term "polyepoxide" refers to an epoxy resin having at least two 1,2-epoxide groups per molecule. In certain embodiments, the epoxy equivalent weight ranges from 100 to 4000 based on solids of the polyepoxide, such as between 100 and 1000. The polyepoxides may be, for example, saturated or unsaturated, and may be, for example, aliphatic, alicyclic, aromatic, or heterocyclic. They may contain substituents such as, for example, halogens, hydroxyl groups, and ether groups.

Suitable classes of polyepoxides include epoxy ethers obtained by reacting an epihalohydrin, such as epichlorohydrin, with a polyphenol in the presence of an alkali. Suitable polyphenols include, for example, resorcinol, catechol, hydroquinone, bis(4-hydroxyphenyl)-2,2-propane (Bisphenol A), bis(4-hydroxyphenyl)-1,1-isobutane, bis(4-hydroxyphenyl)-1,1-ethane, bis(2-hydroxyphenyl)-methane, 4,4-dihydroxybenzophenone, and 1,5-dihydroxynaphthalene. In some cases, the diglycidyl ether of Bisphenol A is especially suitable.

Other suitable polyepoxides include polyglycidyl ethers of polyhydric alcohols and/or polyhydric silicones. Suitable polyhydric alcohols include, without limitation, ethylene glycol, propylene glycol, butylene glycol, 1,6-hexylene glycol, 1,4-cyclohexane dimethanol, hydrogenated Bisphenol A, neopentyl glycol, diethylene glycol, glycerol, trimethylol propane, and pentaerythritol. These compounds may also be derived from polymeric polyols, such as polypropylene glycol.

Examples of other suitable polyepoxides include polyglycidyl esters of polycarboxylic acids. These compounds may be formed by reacting epichlorohydrin or another epoxy material with an aliphatic or aromatic polycarboxylic acid, such as succinic acid, adipic acid, azelaic acid, sebacic acid, maleic acid, 2,6-naphthalene dicarboxylic acid, fumaric acid, phthalic acid, tetrahydrophthalic acid, hexahydrophthalic acid, or trimellitic acid. Dimerized unsaturated fatty acids containing about 36 carbon atoms (Dimer Acid) and polymeric polycarboxylic acids, such as carboxyl terminated acrylonitrile-butadiene rubber, may also be used in the formation of these polyglycidyl esters of polycarboxylic acids.

Polyepoxides derived from the epoxidation of an olefinically unsaturated alicyclic compound are also suitable for use in the coating compositions of the present invention. These polyepoxides are nonphenolic and are obtained by epoxidation of alicyclic olefins with, for example, oxygen, perbenzoic acid, acid-aldehyde monoperacetate, or peracetic acid. Such polyepoxides include the epoxy alicyclic ethers and esters well known in the art.

Other suitable polyepoxides include epoxy novolac resins. These resins are obtained by reacting an epihalohydrin with the condensation product of aldehyde and monohydric or polyhydric phenols. A typical example is the reaction product of epichlorohydrin with a phenol-formaldehyde condensate.

Suitable polyepoxides also include epoxy-functional organopolysiloxanes, such as the resins described in U.S. Pat. No. 6,344,520 at col. 3, line 46 to col. 6, line 41, the cited portion of which being incorporated herein by reference and U.S. Pat. No. 5,939,491 at col. 2, lines 8-39 and col. 4, lines 60 to col. 5, line 7, the cited portions of which being incorporated herein by reference. Epoxy-functional organopolysiloxanes suitable for use in the present invention are also commercially available and include, for example, SILRES HP1000 from Wacker.

The coating compositions of the present invention may contain one polyepoxide or a mixture of two or more polyepoxides.

As indicated, in certain embodiments, the compound comprising functional groups reactive with the amino functionality of the aminofunctional silicon compound(s) comprises a compound having two or more ethylenically unsaturated groups. Suitable materials include polyethylenically unsaturated monomers, such as di- and higher acrylates.

In certain embodiments, however, such a compound comprises an oligomer containing polymerizable ethylenic unsaturation. Examples of such oligomers, which are suitable for use in the present invention, include polyurethane acrylates, polyester acrylates, polyether acrylates, polyacrylates derived from polyepoxides, and acrylate functional acrylic polymers. As will be appreciated by those skilled in the art, such oligomers can be prepared from polyurethane polyols, polyester polyols, polyether polyols, polybutadiene polyols, acrylic polyols, and epoxide resins by reacting all or portions of the hydroxyl groups or epoxy groups with acrylic or methacrylic acid. Also, polyols such as pentaerythritol and trimethylol 10 propane, propylene glycol, and ethylene glycol can be used. Acrylate functional compounds can also be obtained by transesterifying polyols with lower alcohol esters of (meth)acrylic acid. One specific example of an oligomer containing polymerizable ethylenic unsaturation is a tetrafunctional polyester acrylate, such as that which is commercially available from Sartomer under the tradename CN 2262.

The coating compositions of the present invention may contain one compound having two or more ethylenically unsaturated groups or a mixture of two or more compounds having two or more ethylenically unsaturated groups.

In certain embodiments of the present invention, the aminofunctional silicon compound (component 1) and the compound comprising functional groups reactive with the amino functionality of the aminofunctional silicon compound (component 2) are present in the composition in amounts such that the molar ratio of amino reactive groups in component 1 to the reactive groups in component 2 is 0.7 to 1.3:1, in some cases, 0.9 to 1.1:1, and, in yet other cases 1:1.

In certain embodiments, the coating compositions of the present invention also comprise an alkoxy and/or hydroxyl functional polysiloxane. Suitable such polysiloxanes include those of the formula:

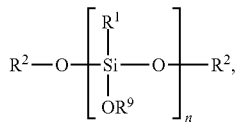

wherein each $R^1$ is independently selected from the group comprising alkyl and aryl radicals, $R^2$ and $R^9$ which may be identical or different, are selected each independently from the group comprising hydrogen, alkyl and aryl radicals, n is selected so that the molecular weight for the polysiloxane is in the range of from 400 to 10,000.

Suitable such polysiloxanes include, but are not necessarily limited to, those having a molecular weight ranging from 500 to 6000 and an alkoxy content ranging from 10 to 50%. Specific examples of suitable alkoxy-functional polysiloxanes include, but are not limited to: DC-3074 and DC3037 from Dow Corning; Silres SY-550, and SY-231 from Wacker Silicone; and Rhodorsil Resin 10369 A, Rhodorsil 48V750, 48V3500 from Rhodia Silicones; and SF1147 from General Electrics. Suitable silanol-functional polysiloxanes include, but are not limited to, Silres SY 300, Silres SY 440, Silres MK and REN 168 from Wacker Silicone, Dow Corning's DC-840, DC233 and DC-431 HS silicone resins and DC-Z-6018 intermediate and Rhodia Silicones' Rhodorsil Resin 6407 and 6482 X.

In certain embodiments, the previously described alkoxy and/or hydroxyl functional polysiloxane is present in the coating compositions of the present invention in an amount of up to 40 percent by weight, such as up to 30 percent by weight, based on the total weight of the composition. In certain embodiments, the previously described polysiloxane is present in the coating compositions of the present invention in an amount of at least 5 percent by weight, such as at least 10 percent by weight, based on the total weight of the composition. The foregoing weight percents are based on the total weight of resins solids in the coating composition.

In certain embodiments, the coating compositions of the present invention comprise a catalyst for promoting cure of the silicon containing compound present in the composition. Examples of such catalysts include paratoluenesulfonic acid, dibutyltin dilaurate and tetraisopropyl titanate.

The coating compositions of the present invention may also include a cure promoting catalyst, such as a base catalyst, to promote the reaction of component 1 with component 2. Suitable base catalysts include triphenylphosphine, ethyltriphenyl phosphonium iodide, tetrabutyl phosphonium iodide and tertiary amines, such as benzyldimethylamine, dimethylaminocyclohexane, triethylamine, and the like, N-methylimidazole, and tetrabutyl ammonium hydroxide. When used, such catalysts are, in certain embodiments, present in an amount of 0.1 to 1 percent by weight, based on the total weight of the coating composition.

In certain embodiments, the coating compositions of the present invention also comprise a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coating compositions of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic, polyester, and/or polyester-alkyd grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the coating compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, which is incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used in the coating compositions of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with certain embodiments of the present invention, have minimal migration out of the coating. Example photosensitive compositions and/or photochromic compositions and methods for making them are identified in United States Published Patent Application No. 2006-0014099 A1, which is incorporated herein by reference.

In general, the colorant can be present in the coating composition in any amount sufficient to impart the desired visual and/or color effect. The colorant may comprise from 1 to 80 weight percent of the present compositions, such as from 3 to 40 weight percent or 5 to 35 weight percent, with weight percent based on the total weight of the compositions.

The coating compositions of the present invention can, if desired, be formulated with a variety of organic solvents, such as ketones, including methyl ethyl ketone, hydrocarbons, such as toluene and xylene, esters, ethers, alcohols, aromatics, and mixtures thereof. In certain embodiments, however, the amount of such solvents is limited, such that certain embodiments of the coating compositions of the present invention are "low VOC" compositions. As used herein, the term "low VOC" refers to compositions comprising no more than 3.5 pounds of volatile organic compounds per gallon of the coating composition.

The coating compositions of the present invention can be utilized as one package compositions or as two package compositions. As two packs, one package comprises component 1 described above and the second pack comprises component 2 described above. The previously described additives and other materials can be added to either package as desired or necessary. The two packages are simply mixed together at or near the time of use.

In certain embodiments, the coating compositions of the present invention also comprise a moisture scavenger. Suitable moisture scavenging ingredients include calcium compounds, such as $CaSO_4\text{-}\frac{1}{2}H_2O$, metal alkoxides, such as tetraisopropyltitanate, tetra n butyl titanate-silanes, QP-53 14, vinylsilane (A171), and organic alkoxy compounds, such as triethyl orthoformate, trimethyl orthoformate, tetramethyl orthosilicate, and methylorthoformate.

In certain embodiments, the moisture scavenger is present in an amount of up to 10 percent by weight, such as 0.25 to 9.75 percent by weight, or, in some cases 5 percent by weight, based on the total weight of the coating composition.

The coating compositions of the present invention are suitable for application to any of a variety of substrates, including human and/or animal substrates, such as keratin, fur, skin, teeth, nails, and the like, as well as plants, trees, seeds, agricultural lands, such as grazing lands, crop lands and the like; turf-covered land areas, e.g., lawns, golf courses, athletic fields, etc., and other land areas, such as forests and the like.

Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in, for example, U.S. Pat. Nos. 4,157, 924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminium derivatives, quebracho, chestnut or mimosa extracts, aromatic syntans, polyurethanes, (co) polymers of (meth) acrylic acid compounds or melamine, dicyanodiamide and/or urea/formaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam. EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface.

The coating compositions of the present invention can be applied to such substrates by any of a variety of methods including spraying, brushing, dipping, and roll coating, among other methods. In certain embodiments, however, the coating compositions of the present invention are applied by spraying and, accordingly, such compositions often have a viscosity, such as no more than 60 cps, that is suitable for application by spraying at ambient conditions.

After application of the coating composition of the present invention to the substrate, the composition is allowed to coalesce to form a substantially continuous film on the substrate. Typically, the film thickness will be 0.01 to 20 mils (about 0.25 to 508 microns), such as 0.01 to 5 mils (0.25 to 127 microns), or, in some cases, 0.1 to 2 mils (2.54 to 50.8 microns) in thickness.

Coatings formed from the coating compositions of the present invention can, in at least some cases, have good flexibility and/or impact resistance. As used herein, a "flexible coating" refers to a coating that exhibits no cracking when tested using a conical mandrel following ASTM D522. As used herein, an "impact resistant" coating refers to a coating that exhibits no cracking when tested according to ASTM D2794 using 160 inch-lbs force resistance.

In certain embodiments, the coating compositions of the present invention are used as primer, basecoat, or topcoat coating compositions for automotive applications, such as automotive refinish applications. Indeed, because of the flexibility and impact resistance properties exhibited by certain coating compositions of the present invention, these compositions can be particularly suitable for use as an automotive topcoat. In addition, because certain coating compositions of the present invention are "low temperature, moisture curable" compositions, they can be particularly suitable for use as a topcoat in automotive refinish applications. As a result, the present invention is also directed to methods for refinishing the surface of an article, such as an article having a metal substrate. These methods of the present invention comprise the steps of: (a) removing a defect from the surface; (b) applying a first coating layer deposited from a film-forming composition over at least a portion of the surface; and (c) applying a topcoat layer directly over at least a portion of the first coating layer, the topcoat being applied using a coating composition of the present invention.

The coating compositions of the present invention may form a single coating layer; or, in certain embodiments, the coating composition may form a layer of a multilayer coating. As a result, the present invention is also directed to multilayer coatings comprising (a) a first coating layer deposited from a film-forming composition comprising a colorant; (b) a second coating layer deposited over at least a portion of the first coating layer, the second coating layer being deposited from a coating composition of the present invention.

Illustrating the invention are the following examples that are not to be considered as limiting the invention to their details. All parts and percentages in the examples, as well as throughout the specification, are by weight unless otherwise indicated.

EXAMPLE 1

This example illustrates the preparation of an silane functional acrylic polyol.

A reaction vessel equipped with a stirrer, thermocouple, condenser and addition funnels equipped with pumps was charged with 252.0 grams of n-butyl acetate and 2.53 grams of triphenyl phosphite and heated to reflux (about 125° C.). Two feeds, identified herein as A and B, were next gradually added to the vessel over a period of three and four hours, respectively, while the contents of the vessel were maintained at reflux conditions. Feed A consisted of a mixture of 127.0 grams styrene, 50.4 grams SILQUEST® A-174 silane (γ-methacryloxypropyltrimethoxysilane from Momentive), 144.2 grams methyl methacrylate, 101.6 grams butyl methacrylate and 83.4 grams 2-ethylhexyl methacrylate. Feed B consisted of a mixture of 30.4 grams Luperox 575 (from Atochem) and 112.0 grams n-butyl acetate. After the addition of the two feeds A and B was complete the contents of the vessel were allowed to reflux for 1 hour. Thereafter, heating was discontinued, the contents of the vessel were allowed to cool and 23.5 grams n-butyl acetate was added.

The resultant product contained a film-forming polymer that had a total solids content measured for 1 hour at 110° C. of 56.8 percent by weight; had a peak molecular weight of 8,769, a weight average molecular weight of 8,765 and a number average molecular weight of 3065 as determined by

EXAMPLE 2

This example illustrates the preparation of a copolymer from Cardura ELOP and 1,4-cyclohexane dimethanol.

A reaction vessel equipped with stirrer, thermocouple, condenser and nitrogen inlet was charged with 187.2 grams (1.3 mole) 1,4-cyclohexane dimethanol, 936.0 grams (3.9 moles) Cardura E10P (from Hexion Specialty Chemicals) and 1.12 grams stannous octoate and heated to 130° C. The reaction exothermed to 143° C. The reaction temperature was raised to 150° C. and the contents were stirred until the epoxy equivalent weight was greater than 13,000.

The resultant product had an epoxy equivalent of 64,963, an APHA color of 80-90, a hydroxyl value of 197.3 mg KOH/g, a weight/gallon of 8.40, had a peak molecular weight of 981, a weight average molecular weight of 929 and a number average molecular weight of 714 as determined by gel permeation chromatography utilizing a polystyrene standard.

EXAMPLE 3

This example illustrates the preparation of a copolymer from Cardura ELOP and 1,4-cyclohexane dimethanol that contains hydrolyzable functional groups.

A reaction vessel equipped with stirrer, thermocouple, condenser and nitrogen inlet was charged with 252.3 grams (0.89 equiv.) of the product of Example 2 and 77.2 grams of n-butyl acetate and heated to 40° C. Next, 164 grams of A-Link 35 (γ-isocyanatopropyltrimethoxysilane available from Momentive Performance Materials) was gradually added to the vessel over a period of 15 minutes. The reaction temperature was raised to 60° C. and the contents were stirred for 3 hours. After this time infrared analysis indicated isocyanate was still present. The reaction temperature was increased to 85° C., an additional 22.5 grams Example 2 added. The reaction contents were stirred until the isocyanate equivalent weight was 77,588.

The resultant product had a total solids content measured for 1 hour at 110° C. of 81.1 percent by weight; has a Gardner-Holt viscosity of H—.

EXAMPLE 4

This example illustrates the preparation of a polysiloxane-polyether polyol, a product of the hydrosilylation of tetramethyl disiloxane with alkenyl alcohols.

A reaction vessel equipped with stirrer, thermocouple, condenser and nitrogen inlet was charged with 915.1 grams (8.96 equivalents) ethylene glycol monoallyl ether (from TCI America), 959.0 grams (8.96 moles) trimethylolpropane diallyl ether (from Perstorp Polyols), 8.8 grams Magnesol Polysorb 30/40 (from the Dallas Group of America), 0.15 grams sodium acetate and 0.126 mL chloroplatinic acid solution (7.5% in isopropanol) and heated to 80° C. At that temperature 52.2 grams 1,1,3,3-tetramethy disiloxane (available from Clariant) was added to the vessel. The reaction temperature increased to 88° C. over 10 minutes. Then 992.2 grams 1,1,3,3-tetramethy disiloxane was gradually added over 4 hours 40 minutes while maintaining a reaction temperature less than 105° C. After the addition was complete, the vessel contents were stirred at 102° C. until the silicon hydride absorption band (S—H, 2150 cm$^{-1}$) was gone by infrared spectroscopy. The vessel contents were cooled to 80° C., 14.64 grams 35% aqueous hydrogen peroxide were added, and the contents were filtered.

The resultant product had a total solids content measured for 1 hour at 110° C. of 87.1 percent by weight; had a peak molecular weight of 1,012, a weight average molecular weight of 1,128 and a number average molecular weight of 574 as determined by gel permeation chromatography utilizing a polystyrene standard; had a Brookfield viscosity of 150 centipoise; had an acid value of 0.80; had a hydroxyl value of 218.9; had a % water content of 0.2.

EXAMPLE 5

This example illustrates the preparation of a silane functional polysiloxane-polyether polyol.

A reaction vessel equipped with stirrer, thermocouple, condenser and nitrogen inlet was charged with 412.0 grams (1.65 equiv.) of the product of Example 4 and heated to 40° C. Next, 338.4 grams A-Link 35 was gradually added to the vessel over a period of 15 minutes. The reaction temperature was raised to 60° C. and the contents were stirred for 2 hours. After this time infrared analysis indicated isocyanate was still present. The reaction temperature was gradually increased to 80° C. The reaction contents were stirred until there was no isocyanate by infrared spectroscopy.

The resultant product had a total solids content measured for 1 hour at 110° C. of 91.4 percent by weight; has a Gardner-Holt viscosity of K—.

EXAMPLE 6

This example illustrates the preparation of a copolymer from Cardura ELOP and trimethylolpropane.

A reaction vessel equipped with stirrer, thermocouple, condenser and nitrogen inlet was charged with 174.3 grams (1.3 mole) trimethylolpropane, 936.0 grams (3.9 moles) Cardura E10P (from Hexion) and 1.11 grams stannous octoate and heated to 130° C. The reaction exothermed to 138° C. The reaction temperature was raised to 150° C. and the contents were stirred until the epoxy equivalent weight was greater than 13,000.

The resultant product had an epoxy equivalent of 32,566, an APHA color of 40-50, a hydroxyl value of 226.3 mg KOH/g, a weight/gallon of 8.44, had a peak molecular weight of 734, a weight average molecular weight of 856 and a number average molecular weight of 766 as determined by gel permeation chromatography utilizing a polystyrene standard.

EXAMPLE 7

This example illustrates the preparation of a copolymer from Cardura ELOP and trimethylolpropane that contains hydrolyzable functional groups.

A reaction vessel equipped with stirrer, thermocouple, condenser and nitrogen inlet was charged with 171.2 grams (0.69 equiv.) of the product of Example 6 and 60.1 grams of n-butyl acetate and heated to 40° C. Next, 141.6 grams A-Link 35 (from Momentive Performance Materials) was gradually added to the vessel over a period of 15 minutes. The reaction temperature was raised to 60° C. and the contents were stirred for 2.5 hours. After this time infrared analysis indicated isocyanate was still present. The reaction temperature gradually increased to 75° C. The reaction contents were stirred until there was no isocyanate by infrared spectroscopy.

The resultant product had a total solids content measured for 1 hour at 110C of 79.6 percent by weight; has a Gardner-Holt viscosity of E-F.

EXAMPLE 8

A 96% solids white tint paste was made by adding 1000 grams of neutral titanium dioxide (R-960-38; Dupont) to a stirring mixture (via a Cowles blade) of 500 grams of an epoxy resin (Eponex 1510; Hexion) and 116 grams of a dispersing agent (DisperByk 182; Byk Chemie). The mixture was then ground at a high speed for ~1.5 hours, or until the paste reached a 7 on the Hegman scale. The pigment to binder ratio was 2:1.

EXAMPLE 9

An 89% solids coating formula was prepared by mixing 60.38 grams of the product of Example 8, 5.76 grams of diglycidyl ether of cyclohexane dimethanol (Heloxy modifier 107; Hexion), 13.4 grams of an alkoxy-functional siloxane resin (Silres SY 231; Wacker Silicones), 15.1 grams of the product of Example 1, 28.35 grams of the product of Example 5, 17.19 grams of an amino-functional polysiloxane (Silres HP 2000; Wacker Silicones), 15.09 grams of 3-aminopropylmethyldiethoxysilane (SIA0605.0; Gelest), 0.4 grams of a silicone surface additive (Byk 333; Byk Chemie), and 0.7 grams of dibutyl tin dilaurate (DABCO T-12; Air Products and Chemicals). The formula was based on a 1:1 epoxy to amine (primary and secondary) ratio. The pigment weight concentration was 26%, and the pigment to binder ratio was 0.37.

The coating formula was sprayed, using a HVLP cup gun with a 1.4mm flow tip (GTI Millenium; DeVilbiss), onto cold-rolled steel substrates that had been primed with a commercial epoxy primer (Delfleet Evolution F3950; PPG Industries, Inc.), a commercial polyurethane primer (Delfleet Evolution F3970; PPG Industries, Inc.) or an electrodeposition-type primer (ED6061; PPG Industries, Inc.). All primers were mechanically sanded with 320 grit paper before applying the topcoat. Two coats were applied to the substrates, with 5-15 minutes flashing between each coat. The coating had a dust-free time (cotton ball test) of 45 minutes (at 71° F., 44% relative humidity).

The coating was allowed to cure for 7 days before being tested. The dry film thickness (DFT) was ~3.0 mils.

Physical test results over the epoxy primer demonstrated a crosshatch adhesion of 5B (ASTM D3359), a pendulum hardness (Konig) of 82 seconds (ASTM D4366), a 60° gloss reading of 87.5 (ASTM D523), a DOI of 40 (ASTM D5767), an MEK solvent resistance of >100 double rubs (ASTM D5402), 0.6 cm cracking from a conical mandrel bend (ASTM D522), and a 50 inch-lbs. force resistance during a forward impact test (ASTM D2794).

Physical test results over the polyurethane primer demonstrated a pendulum hardness (Konig) of 64 seconds (ASTM D4366), a 60° gloss reading of 86.4 (ASTM D523), a DOI of 40 (ASTM D5767), an MEK solvent resistance of >100 double rubs (ASTM D5402), 0 cm cracking from a conical mandrel bend (ASTM D522), and a 90 inch-lbs. force resistance during a forward impact test (ASTM D2794).

Physical test results over the electrodeposition primer demonstrated a crosshatch adhesion of 5B (ASTM D3359), a pendulum hardness (Konig) of 89 seconds (ASTM D4366), a 60° gloss reading of 87.3 (ASTM D523), a DOI of 40 (ASTM D5767), an MEK solvent resistance of >100 double rubs (ASTM D5402), 0 cm cracking from a conical mandrel bend (ASTM D522), and >160 inch-lbs. force resistance during a forward impact test (ASTM D2794).

EXAMPLE 10

An 88% solids formula was prepared by mixing 69.6 grams of a commercial white tint paste (Delfleet Evolution F3552; PPG Industries, Inc.), 20.02 grams of an epoxy resin (Eponex 1510; Hexion), 16.23 grams of an alkoxy-functional polysiloxane (Silres SY 231; Wacker Silicones), 22.74 grams of the product of Example 3, 5 grams of n-pentyl propionate (Dow chemical), 12.92 grams of an amino-functional polysiloxane (Silres HP 2000; Wacker Silicones), 11.29 grams of 3-aminopropylmethyldiethoxysilane (SIA0605.0; Gelest), 0.4 grams of a silicone surface additive (Byk 333; Byk Chemie), and 0.7 grams of dibutyl tin dilaurate (DABCO T-12; Air Products and Chemicals). The formula was based on a 1:1 epoxy to amine (primary and secondary) ratio. The pigment weight concentration was 27%, and the pigment to binder ratio was 0.38.

The coating formula was sprayed, using a HVLP cup gun with a 1.4mm flow tip (GTI Millenium; DeVilbiss), onto cold-rolled steel substrates that had been primed with a commercial epoxy primer (Delfleet Evolution F3950; PPG Industries, Inc.), a commercial polyurethane primer (Delfleet Evolution F3970; PPG Industries, Inc.) or an electrodeposition-type primer (ED6061; PPG Industries, Inc.). All primers were mechanically sanded with 320 grit paper before applying the topcoat. Two coats were applied to the substrates, with 5-15 minutes flashing between each coat. The coating had a dust-free time (cotton ball test) of 67 minutes (at 71° F., 32% relative humidity).

The coating was allowed to cure for 10 days before being tested. The dry film thickness (DFT) was ~2.7 mils.

Physical test results over the epoxy primer demonstrated a pendulum hardness (Konig) of 56 seconds (ASTM D4366), a 60° gloss reading of 95.9 (ASTM D523), a DOI of 30 (ASTM D5767), an MEK solvent resistance of >100 double rubs (ASTM D5402), 8.7 cm cracking from a conical mandrel bend (ASTM D522), and a 40 inch-lbs. force resistance during a forward impact test (ASTM D2794).

Physical test results over the polyurethane primer demonstrated a crosshatch adhesion of 5B (ASTM D3359), a pendulum hardness (Konig) of 45 seconds (ASTM D4366), a 60° gloss reading of 96.7 (ASTM D523), a DOI of 30 (ASTM D5767), an MEK solvent resistance of >100 double rubs (ASTM D5402), 0 cm cracking from a conical mandrel bend (ASTM D522), and 110 inch-lbs. force resistance during a forward impact test (ASTM D2794).

Physical test results over the electrodeposition primer demonstrated a crosshatch adhesion of 5B (ASTM D3359), a pendulum hardness (Konig) of 51 seconds (ASTM D4366), a 60° gloss reading of 94.6 (ASTM D523), a DOI of 30 (ASTM D5767), an MEK solvent resistance of >100 double rubs (ASTM D5402), 0 cm cracking from a conical mandrel bend (ASTM D522), and >160 inch-lbs. force resistance during a forward impact test (ASTM D2794).

EXAMPLE 11

An 83% solids formula was prepared by mixing 34.34 grams of a commercial black tint paste (Delfleet Evolution F3547; PPG Industries, Inc.), 20.02 grams of an epoxy resin (Eponex 1510; Hexion), 16.23 grams of an alkoxy-functional polysiloxane (Silres SY 231; Wacker Silicones), 22.74 grams of the product of Example 3, 5 grams of n-pentyl propionate (Dow chemical), 12.92 grams of an amino-functional polysiloxane (Silres HP 2000; Wacker Silicones), 11.29 grams of 3-aminopropylmethyldiethoxysilane (SIA0605.0; Gelest), 0.4 grams of a silicone surface additive (Byk 333; Byk Chemie), and 0.7 grams of dibutyl tin dilaurate (DABCO T-12; Air Products and Chemicals). The formula was based on a 1:1 epoxy to amine (primary and secondary) ratio. The pigment weight concentration was 1.33%, and the pigment to binder ratio was 0.0137.

The coating formula was sprayed, using a HVLP cup gun with a 1.4 mm flow tip (GTI Millenium; DeVilbiss), onto cold-rolled steel substrates that had been primed with a commercial epoxy primer (Delfleet Evolution F3950; PPG Industries, Inc.), a commercial polyurethane primer (Delfleet Evolution F3970; PPG Industries, Inc.) or an electrodeposition-type primer (ED6061; PPG Industries, Inc.). All primers were mechanically sanded with 320 grit paper before applying the topcoat. Two coats were applied to the substrates, with 5-15 minutes flashing between each coat. The coating had a dust-free time (cotton ball test) of 100 minutes (at 71° F., 32% relative humidity).

The coating was allowed to cure for 10 days before being tested. The dry film thickness (DFT) was ~1.5 mils.

Physical test results over the epoxy primer demonstrated a pendulum hardness (Konig) of 62 seconds (ASTM D4366), a 60° gloss reading of 93.5 (ASTM D523), a DOI of 50 (ASTM D5767), an MEK solvent resistance of >100 double rubs (ASTM D5402), 3.9 cm cracking from a conical mandrel bend (ASTM D522), and a 40 inch-lbs. force resistance during a forward impact test (ASTM D2794).

Physical test results over the polyurethane primer demonstrated a crosshatch adhesion of 5B (ASTM D3359), a pendulum hardness (Konig) of 40 seconds (ASTM D4366), a 60° gloss reading of 93.3 (ASTM D523), a DOI of 50 (ASTM D5767), an MEK solvent resistance of >100 double rubs (ASTM D5402), 0 cm cracking from a conical mandrel bend (ASTM D522), and >160 inch-lbs. force resistance during a forward impact test (ASTM D2794).

Physical test results over the electrodeposition primer demonstrated a crosshatch adhesion of 5B (ASTM D3359), a pendulum hardness (Konig) of 79 seconds (ASTM D4366), a 60° gloss reading of 93.3 (ASTM D523), a DOI of 50 (ASTM D5767), an MEK solvent resistance of >100 double rubs (ASTM D5402), 0 cm cracking from a conical mandrel bend (ASTM D522), and >160 inch-lbs. force resistance during a forward impact test (ASTM D2794).

EXAMPLE 12

A 77% solids formula was prepared by mixing 73.05 grams of a commercial red tint paste (Delfleet Evolution F3530; PPG Industries, Inc.), 20.02 grams of an epoxy resin (Eponex 1510; Hexion), 16.23 grams of an alkoxy-functional siloxane resin (Silres SY 231; Wacker Silicones), 22.74 grams of the product of Example 3, 5 grams of n-pentyl propionate (Dow chemical), 12.92 grams of an amino-functional polysiloxane (Silres HP 2000; Wacker Silicones), 11.29 grams of 3-aminopropylmethyldiethoxysilane (SIA0605.0; Gelest), 0.4 grams of a silicone surface additive (Byk 333; Byk Chemie), and 0.7 grams of dibutyl tin dilaurate (DABCO T-12; Air Products and Chemicals). The formula was based on a 1:1 epoxy to amine (primary and secondary) ratio. The pigment weight concentration was 17.37%, and the pigment to binder ratio was 0.21.

The aforementioned formula was sprayed, using a HVLP cup gun with a 1.4 mm flow tip (GTI Millenium; DeVilbiss), onto cold-rolled steel substrates that had been primed with a commercial epoxy primer (Delfleet Evolution F3950; PPG Industries, Inc.), a commercial polyurethane primer (Delfleet Evolution F3970; PPG Industries, Inc.) or an electrodeposition-type primer (ED6061; PPG Industries, Inc.). All primers were mechanically sanded with 320 grit paper before applying the topcoat. Two coats were applied to the substrates, with 5-15 minutes flashing between each coat. The coating had a dust-free time (cotton ball test) of 70 minutes (at 71° F., 32% relative humidity).

The coating was allowed to cure for 10 days before being tested. The dry film thickness (DFT) was ~2.3 mils.

Physical test results over the epoxy primer demonstrated a pendulum hardness (Konig) of 57 seconds (ASTM D4366), a 60° gloss reading of 91.6 (ASTM D523), a DOI of 50 (ASTM D5767), an MEK solvent resistance of >100 double rubs (ASTM D5402), 7.3 cm cracking from a conical mandrel bend (ASTM D522), and a 50 inch-lbs. force resistance during a forward impact test (ASTM D2794).

Physical test results over the polyurethane primer demonstrated a crosshatch adhesion of 5B (ASTM D3359), a pendulum hardness (Konig) of 46 seconds (ASTM D4366), a 60° gloss reading of 91.5 (ASTM D523), a DOI of 40 (ASTM 5767), an MEK solvent resistance of >100 double rubs (ASTM D5402), 0 cm cracking from a conical mandrel bend (ASTM D522), and >160 inch-lbs. force resistance during a forward impact test (ASTM D2794).

Physical test results over the electrodeposition primer demonstrated a crosshatch adhesion of 5B (ASTM D3359), a pendulum hardness (Konig) of 61 seconds (ASTM D4366), a 60° gloss reading of 92.3 (ASTM D523), a DOI of 40 (ASTM 5767), an MEK solvent resistance of >100 double rubs (ASTM D5402), 0 cm cracking from a conical mandrel bend (ASTM D522), and >160 inch-lbs. force resistance during a forward impact test (ASTM D2794).

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:
1. A coating composition comprising:
(1) an aminofunctional polysiloxane;
(2) a polysiloxane, wherein the polysiloxane is an ungelled reaction product of the following reactants:
  (a) a polysiloxane containing silicon hydride having the following structure:

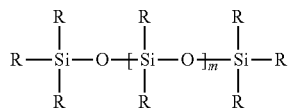

wherein the R groups are independently selected from the group consisting of H, OH, and monovalent hydrocarbon groups connected to the silicon atoms, provided that at least one of the groups represented by R is H; and m ranges from 0 to 100, such that the mole percent of hydrogen-bonded silicon atoms to non-hydrogen-bonded silicon atoms ranges from 10 to 100; and
  (b) a hydroxyl functional group-containing material having two or more unsaturated bonds capable of undergoing hydrosilylation reaction; and
(3) a polyepoxide.

2. The coating composition of claim 1, further comprising an acrylic polymer.

3. The coating composition of claim 2, wherein the acrylic polymer comprises a silicon containing acrylic polymer.

4. The coating composition of claim 1, further comprising an alkoxy and/or hydroxyl functional polysiloxane having the formula:

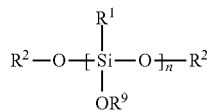

wherein each $R^1$ is independently selected from the group comprising alkyl and aryl radicals, $R^2$ and $R^9$ which may be identical or different, are selected each independently from the group comprising hydrogen, alkyl and aryl radicals, and n is selected so that the molecular weight for the polysiloxane is in the range of from 400 to 10,000.

5. A coating composition comprising:
(1) an aminofunctional silicon compound;
(2) a polysiloxane, wherein the polysiloxane is an ungelled reaction product of the following reactants:
  (a) a polysiloxane containing silicon hydride having the following structure:

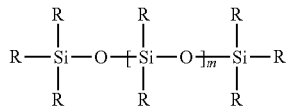

wherein the R groups are independently selected from the group consisting of H, OH, and monovalent hydrocarbon groups connected to the silicon atoms, provided that at least one of the groups represented by R is H; and m ranges from 0 to 100, such that the mole percent of hydrogen-bonded silicon atoms to non-hydrogen-bonded silicon atoms ranges from 10 to 100; and
  (b) a hydroxyl functional group-containing material having two or more unsaturated bonds capable of undergoing hydrosilylation reaction;
(3) a compound comprising functional groups reactive with the amino functionality of the aminofunctional silicon compound; and
(4) an alkoxy and/or hydroxyl functional polysiloxane having the formula:

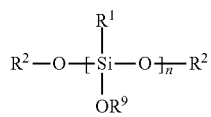

wherein each $R^1$ is independently selected from the group comprising alkyl and aryl radicals, $R^2$ and $R^9$ which may be identical or different, are selected each independently from the group comprising hydrogen, alkyl and aryl radicals, and n is selected so that the molecular weight for the polysiloxane is in the range of from 400 to 10,000.

6. The coating composition of claim 5, wherein the aminofunctional silicon compound comprises both an aminofunctional silane and an aminofunctional polysiloxane.

7. The coating composition of claim 5, further comprising an acrylic polymer.

8. The coating composition of claim 7, wherein the acrylic polymer comprises a silicon containing acrylic polymer.

9. The coating composition of claim 5, wherein the compound comprising functional groups reactive with the amino functionality of the aminofunctional silicon compound comprises a polyepoxide.

10. A coating composition comprising:
(1) an aminofunctional polysiloxane;
(2) an aminofunctional silane;
(3) a polysiloxane, wherein the polysiloxane is an ungelled reaction product of the following reactants:
  (a) a polysiloxane containing silicon hydride having the following structure:

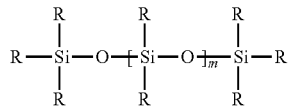

wherein the R groups are independently selected from the group consisting of H, OH, and monovalent hydrocarbon groups connected to the silicon atoms, provided that at least one of the groups represented by R is H; and m ranges from 0 to 100, such that the mole percent of hydrogen-bonded silicon atoms to non-hydrogen-bonded silicon atoms ranges from 10 to 100; and
  (b) a hydroxyl functional group-containing material having two or more unsaturated bonds capable of undergoing hydrosilylation reaction; and
(4) a compound comprising functional groups reactive with the amino functionality of (1) and (2).

11. The coating composition of claim 10, further comprising an alkoxy and/or hydroxyl functional polysiloxane having the formula:

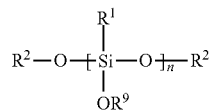

wherein each $R^1$ is independently selected from the group comprising alkyl and aryl radicals, $R^2$ and $R^9$ which may be identical or different, are selected each independently from the group comprising hydrogen, alkyl and aryl radicals, and n is selected so that the molecular weight for the polysiloxane is in the range of from 400 to 10,000.

12. The coating composition of claim 10, further comprising an acrylic polymer.

13. The coating composition of claim 12, wherein the acrylic polymer comprises a silicon containing acrylic polymer.

14. The coating composition of claim 10, wherein the compound comprising functional groups reactive with the amino functionality of the aminofunctional polysiloxane comprises a polyepoxide.

15. A coating composition comprising:
(1) an aminofunctional silicon compound;
(2) polysiloxane, wherein the polysiloxane is an ungelled reaction product of the following reactants:
  (a) a polysiloxane containing silicon hydride having the following structure:

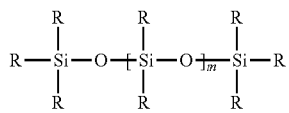

wherein the r groups are independently selected from the group consisting of H, OH, and monovalent hydrocarbon groups connected to the silicon atom provided that at least one of the groups represented by R is H; and m ranges from 0 to 100, such that the mole percent of hydrogen-bonded silicon atoms to non-hydrogen-bonded silicon atoms ranges from 10 to 100; and (b) a hydroxyl functional group-containing material having two or more unsaturated bonds capable of undergoing hydrosilylation reaction;

(3) a silicon containing acrylic polymer comprising hydrolyzable groups; and (4) a compound comprising functional groups reactive with the amino functionality of component (1).

16. The coating composition of claim 15, wherein the aminofunctional silicon compound comprises both an aminofunctional silane and an aminofunctional polysiloxane.

17. The coating composition of claim 15, wherein the compound comprising functional groups reactive with the amino functionality of the aminofunctional silicon compound comprises a polyepoxide.

18. The coating composition of claim 15, further comprising an alkoxy and/or hydroxyl functional polysiloxane having the formula:

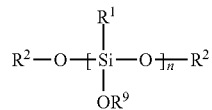

wherein each $R^1$ is independently selected from the group comprising alkyl and aryl radicals, $R^2$ and $R^9$ which may be identical or different, are selected each independently from the group comprising hydrogen, alkyl and aryl radicals, and n is selected so that the molecular weight for the polysiloxane is in the range of from 400 to 10,000.

* * * * *